(12) United States Patent
Park et al.

(10) Patent No.: US 6,319,424 B1
(45) Date of Patent: *Nov. 20, 2001

(54) POLYMER/LIQUID DISPERSION, COMPOSITE FILM AND METHOD FOR PRODUCING SAME

(75) Inventors: Soo-Jin Park; Jae-Rock Lee, both of Daejeon; Mun-Han Kim, Youngcheon, all of (KR)

(73) Assignee: Korea Research Institute of Chemical Technology, Daejeon (KR)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/260,019

(22) Filed: Mar. 2, 1999

(30) Foreign Application Priority Data

Oct. 28, 1998 (KR) .................................... 98-46526

(51) Int. Cl.[7] .......................... C09K 19/52; C09K 19/54; C09K 19/38
(52) U.S. Cl. .................................... 252/299.01; 252/299.5
(58) Field of Search ....................... 428/1.1; 252/299.01, 252/299.5; 349/10, 86

(56) References Cited

U.S. PATENT DOCUMENTS

| | | | |
|---|---|---|---|
| 5,216,096 | * 6/1993 | Hattori et al. | 526/201 |
| 5,270,843 | * 12/1993 | Wang | 359/52 |
| 5,679,414 | * 10/1997 | Akashi et al. | 428/1 |
| 5,835,174 | * 11/1998 | Clikemann et al. | 349/86 |
| 5,843,332 | * 12/1998 | Takeuchi et al. | 252/299.01 |
| 5,976,405 | * 11/1999 | Clikeman et al. | 252/299.01 |
| 6,042,945 | * 3/2000 | Maekawa et al. | 428/411.1 |
| 6,067,135 | * 5/2000 | Shimizu et al. | 349/86 |
| 6,083,575 | * 7/2000 | Ninomiya et al. | 428/1.1 |
| 6,108,062 | * 8/2000 | Takeuchi et al. | 349/88 |

* cited by examiner

*Primary Examiner*—Shean C. Wu
(74) *Attorney, Agent, or Firm*—Staas & Halsey LLP

(57) ABSTRACT

A polymer/liquid crystal dispersion includes a liquid crystal, a surfactant and a water soluble copolymer obtained by polymerizing a hydrophilic monomer with one or more hydrophobic monomers. The concentration of the hydrophobic monomer may be 14 to 25% by weight based on the combined weight of the hydrophobic monomer and the hydrophilic monomer. The hydrophobic monomer may be styrene, 3-(trifluoromethyl)styrene, nonylphenol, methacryloyl chloride, methacrylate, and acrylate. The hydrophilic monomer may be acrylamide, acrylonitrile or acryloyl chloride. Preferably, the hydrophilic monomer is acrylamide or a derivative thereof and the hydrophobic monomer is styrene, methyl methacrylate or vinyl acetate. The liquid crystal may be a nematic liquid crystal formed of an azomethine compound or an azo compound. The water soluble copolymer, the liquid crystal, the surfactant and water may form a liquid crystal/aqueous polymer solution. In this case, the concentration of the liquid crystal in the liquid crystal/aqueous polymer solution is preferably in the range of 50 to 70% by weight and the concentration of the surfactant is preferably in the range of 1 to 5.5% by weight. A composite film may be formed from the polymer/liquid crystal dispersion and a pair of plates sandwiching the polymer liquid crystal emulsion.

13 Claims, 6 Drawing Sheets

POLYMER/LIQUID DISPERSION, COMPOSITE FILM AND METHOD FOR PRODUCING SAME

BACKGROUND OF THE INVENTION

1. Field of the Invention

The present invention relates in general to polymer dispersions and liquid crystal composite films. More specifically, the present invention relates to a highly functional copolymer/liquid crystal dispersion formed by copolymerizing a hydrophilic monomer with a hydrophobic monomer to introduce hydrophobic nature, and adding a surfactant to the resultant copolymer.

2. Description of the Prior Art

As a medium for transmitting various kinds of information in the Age of Information, a liquid crystal display (hereinafter referred to as "LCD") is one of the most widely used apparatuses together with a cathode ray tube (referred to as "CRT"). However, LCDs adopting a twisted nematic (hereinafter referred to as "TN") or a super twisted nematic (referred to as "STN") mode which have been most widely used, are associated with light transmission problems and a complicated fabrication process thereof. This has made it difficult to produce large LCDs using these techniques.

Polymer dispersion liquid crystal (referred to as "PDLC") composite films have polymer and liquid crystal phases to form a composite film. These PDLC films control the scattering of transmitted light at the interface of the polymer matrix/liquid crystal phase, with liquid crystals responding to electrical energy. PDLC films are produced by dispersing low molecular weight nematic liquid crystals in the polymer matrix. The liquid crystal spheres have a diameter of 1 to 10 mm. The need for PDLC films started from using liquid crystals among new polymer material fields having electro-optical properties. PDLC composite films have several advantages compared with other liquid crystal display materials. PDLC composite films do not employ a polarizing plate, and therefore, there is more transmitted light, and a screen produced therefrom is much brighter. Furthermore, since there is no need to align the liquid crystals, the manufacturing process is comparatively simple and large plates can be prepared from PDLC films. The production cost of a PDLC device is less than that for a device using other materials. Moreover, the liquid crystals are dispersed in a polymer matrix, and the films are flexible, both factors contributing to stability.

The method for preparing PDLC composite films necessitates a phase separation procedure, so that low molecular weight nematic crystal liquids can be dispersed evenly in a polymer matrix. There are three phase separating methods, polymerization induced phase separation, thermally induced phase separation and solvent induced phase separation methods. In the present invention, a nematic curvilinear aligned phase (hereinafter referred to as "NCAP") method which allows for the formation of liquid crystal dispersion polymer composite film of PDLC film is employed, although it is not a phase separation method. The NCAP method refers to a method for preparing a PDLC shutter by dispersing and emulsifying a nematic liquid crystal capsule in a water-soluble polymer solution, applying the emulsion onto a conductive transparent plate, drying the emulsion to form a PDLC film, and then laminating another conductive transparent plate. The liquid crystal droplets are neither linked to each other nor dispersed in a regular size and show a very high contrast ratio.

In the prior art process for preparing a PDLC film, it was necessary to use a dispersing agent to improve the dispersibility of the liquid crystals in a hydrophilic polymer matrix. However, PDLC films prepared by the above methods have the following demerits. Chiefly, the response rate is slow. After removing an electrical field, it takes a long time for liquid crystals to be restored to their original position. In addition, the liquid crystals of these devices amount to about 80 to 85% by weight of the device, making the manufacturing cost too expensive.

SUMMARY OF THE INVENTION

Accordingly, it is an object of the present invention to avoid LCD light transmission problems.

It is a further object of the present invention to provide an LCD which is relatively easy to produce.

It is a still further object of the present invention to provide an LCD having a better response time.

These and other objects are accomplished by providing a polymer/liquid crystal dispersion includes a liquid crystal, a surfactant and a water soluble copolymer obtained by polymerizing a hydrophilic monomer with one or more hydrophobic monomers. The concentration of the hydrophobic monomer may be 14 to 25% by weight based on the combined weight of the hydrophobic monomer and the hydrophilic monomer. The hydrophobic monomer may be styrene, 3-(trifluoromethyl)styrene, nonylphenol, methacryloyl chloride, methacrylate, and acrylate. The hydrophilic monomer may be acrylamide, acrylonitrile or acryloyl chloride. Preferably, the hydrophilic monomer is acrylamide or a derivative thereof and the hydrophobic monomer is styrene, methyl methacrylate or vinyl acetate. The liquid crystal may be a nematic liquid crystal formed of an azomethine compound or an azo compound. The water soluble copolymer, the liquid crystal, the surfactant and water may form a liquid crystal/aqueous polymer solution. In this case, the concentration of the liquid crystal in the liquid crystal/aqueous polymer solution is preferably in the range of 50 to 70% by weight and the concentration of the surfactant is preferably in the range of 1 to 5.5% by weight. A composite film may be formed from the polymer/liquid crystal dispersion and a pair of plates sandwiching the polymer liquid crystal emulsion.

Other objects and features of the present invention will become apparent upon analysis of the following detailed description, to those skilled in the art of this technology. It should be understood, however, that the detailed description and specific examples, while indicating preferred embodiments of the present invention, are given by way of illustration and not by way of limitation. Many changes and modifications within the scope of the present invention may be made without departing from the spirit thereof, and the invention includes all such modifications.

BRIEF DESCRIPTION OF THE DRAWINGS

These and other objects and advantages of the invention will become apparent and more readily appreciated from the following description of the preferred embodiments, taken in conjunction with the accompanying drawings of which.

DETAILED DESCRIPTION OF THE PREFERRED EMBODIMENTS

Figure 1:
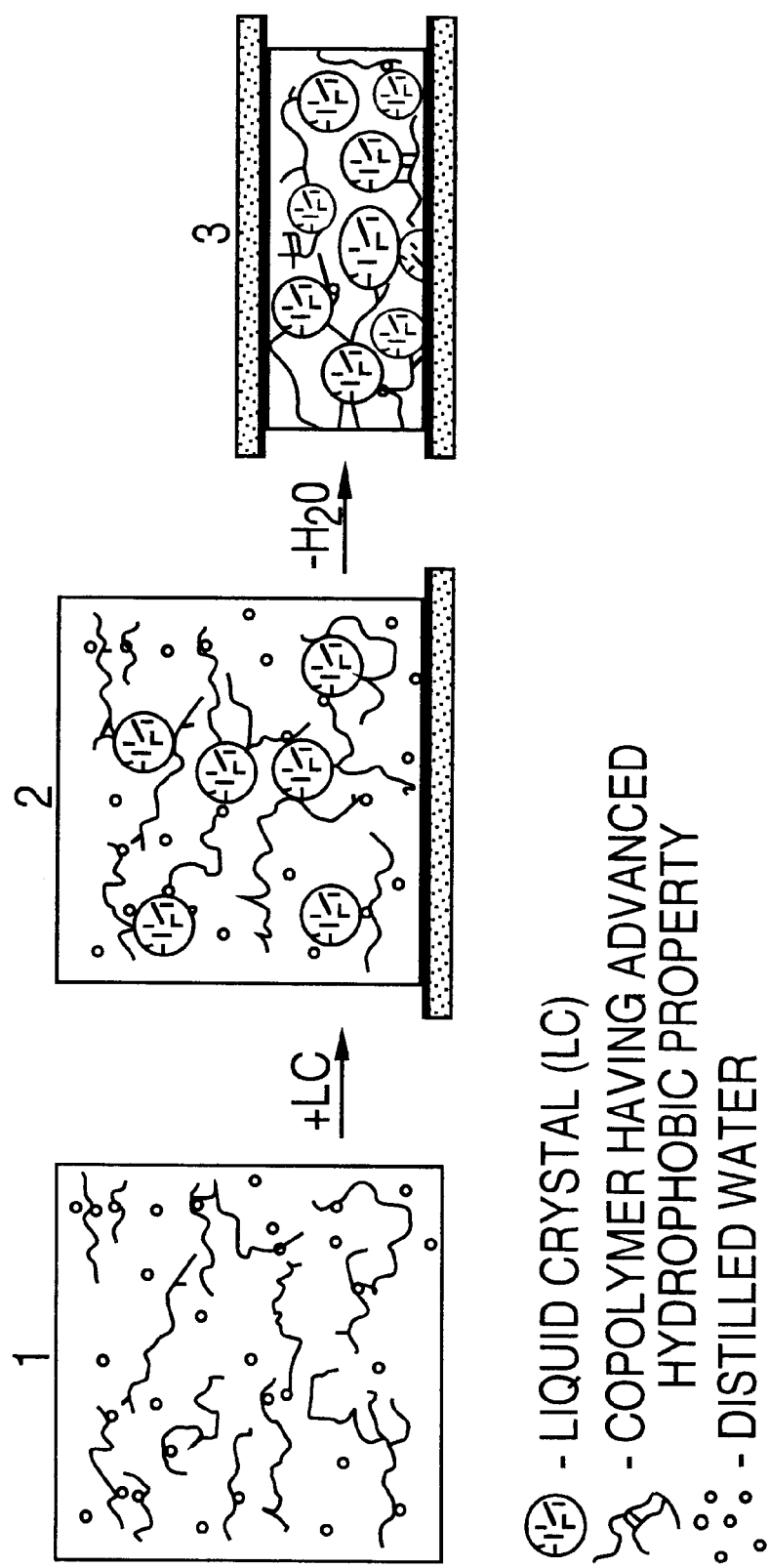
FIG. 1 shows a schematic view of a method for producing NCAP films from a liquid crystal emulsion of a water soluble polymer according to the present invention.

Reference will now made in detail to the present preferred embodiments of the present invention, examples of which are illustrated in the accompanying drawings.

The present invention relates to a liquid crystal emulsion for NCAP films with liquid crystals having improved dispersibility and stability in a polymer matrix. The matrix is formed by copolymerization of a hydrophilic monomer and one or more hydrophobic monomers. The copolymer is dissolved in a water-surfactant solution. The liquid crystals are dispersed in the solution.

The copolymers used for the matrix of the NCAP films are water soluble. The hydrophilic monomers give the copolymer the water soluble property. Compounds which are polymerizable and have polar substituents, for example, acrylamide, acrylonitrile and acryloyl chloride are particularly suitable for the hydrophilic monomer. Acrylamide is the most preferred of these monomers.

The hydrophobic monomer enables a polymer structure capable of being adsorbed into liquid crystals. For the hydrophobic monomer, compounds which are polymerizable and do not have polar substituents should be used. Examples of hydrophobic monomers include styrene, 3-(trifluoromethyl)styrene, nonylphenyl methacrylate, acrylate and methacrylate. Among them, styrene, 3-(trifluoromethyl)styrene and nonylphenyl methacrylate are especially preferred.

The content of hydrophobic monomer(s) can be varied, but is preferably 10 to 25% by weight on the basis of the total weight of the copolymer. When the content of hydrophobic monomer(s) is less than 10% by weight, the dispersibility of liquid crystals in a liquid crystal/aqueous polymer solution is very slow, and the coalescence time (the time required for droplets of liquid crystal to coalescence with each other) is short. The coalescence time is a measure of the stability of a dispersed liquid crystal. On the other hand, when the content of hydrophobic monomer(s) is more than 25% by weight, the compatibility of the copolymer with the liquid crystal increases such that there are more hydrophobic portions of the copolymer to be adsorbed on the surface of the droplets of liquid crystals. However, since solubility in water decreases, there is reduced dispersibility of the liquid crystals. Therefore, such a copolymer is not suitable as a matrix for a PDLC film.

Examples of copolymers types usable in the present invention are conventional copolymers types. For example, random copolymers, alternative copolymers, block copolymers and graft copolymers can be used. Random copolymers can be easily synthesized by a generic method without any special procedure for the specific copolymer being made. On the contrary, when preparing alternative copolymers, block copolymers and graft copolymers, special catalysis and reaction mechanisms should be considered in accordance with the type of monomers used and copolymer made. Thus, random copolymers have been predominantly used in the preparation of PDLC films. The method for synthesizing block copolymers is relatively complicated as compared to that of random copolymers. However, for these coalescence occurs between hydrophobic groups resulting in the copolymer showing properties of the hydrophobic monomer. Accordingly, random copolymers and block copolymers are preferred in the present invention.

Examples of nematic liquid crystals usable in the present invention are azomethine compounds, azo compounds, ester compounds and biphenyl compounds. Among those, azomethine compounds and azo compounds are particularly preferred.

The following are examples of the structural formulas of copolymers, which can be used with the present invention:

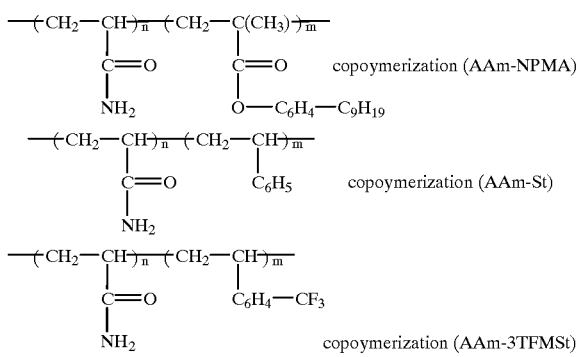

In the above, "NPMA" represents nonylphenyl methacrylate, "St" represents styrene and "3TFMSt" indicates 3-(trifluoromethyl)styrene.

The concentration of liquid crystal in the liquid crystal/aqueous polymer solution is in the range of 50 to 70% by weight. Although other concentrations are possible, when the concentration of liquid crystal is less than 50% by weight, the maximum transmittance ($T_{max}$) and minimum transmittance ($T_{min}$) both increase. The minimum transmittance increases faster than the maximum transmittance, result in reduced contrast, as calculated by $T_{max}/T_{min}$. When the concentration of liquid crystals exceeds 70% by weight, the minimum transmittance and maximum transmittance both decrease. Accordingly, the liquid crystal/aqueous polymer solution fails to display electro-optical properties suitable for PDLC films in display devices.

As mentioned above, the copolymer is dissolved in a water/surfactant solution prior to combining the copolymer and liquid crystal. Examples of suitable surfactants include non-ionic surfactants, cationic surfactants, anionic surfactants and ampholytic surfactants. Non-ionic surfactants are particularly suitable. Preferable non-ionic surfactants are those of which the interaction with the hydrophilic portion of copolymer is weak, but the interaction with the hydrophobic portion of copolymer is strong. Examples of such non-ionic surfactants are polyoxyethylene-, sorbitan-, glucose- and hydroxyl types. Among them, polyoxyethylene type non-ionic surfactants are particularly favored.

The surfactant concentration may be varied, but is preferably in the range of 1 to 5.5% by weight. If the concentration is less than 1% by weight, the dispersibility of liquid crystal in an aqueous polymer solution decreases, and this enlarges the size of the liquid crystals within the PDLC film. Enlarged liquid crystals translate to a decreased contrast, other undesired electro-optical properties, an increased driving voltage and hysteresis. These qualities make the PDLC film unsuitable for normal use. If the surfactant concentration exceeds 5.5% by weight, the size of the dispersed liquid crystals becomes decreases greatly, resulting in a sharp decrease in both the driving voltage and the hysteresis. Decreased contrast is also associated with a high surfactant concentration.

When preparing PDLC films by the NCAP method using liquid crystals, an aqueous polymer solution and a surfactant, as mentioned above, the thickness of final film determines the electrical properties thereof, such as the dielectric constant of a matrix. Although the thickness can be varied, it is preferable that the thickness of the final film be 6 to 25 $\mu$m in order to control the sensitivity of liquid crystals to an applied electric field. When the thickness is less than 6 $\mu$m, the driving voltage may decrease. In a case where an outside electric field is not applied, transmittance may increase. When an excessively large electric field is applied, the PDLC film itself may be destroyed. When the thickness exceeds 25 $\mu$m, a large driving voltage may be required, and when the electric field is removed, the liquid crystal may not return to the original disordered alignment within a sufficiently short time, thereby causing a very large hysteresis phenomenon.

As seen from the facts mentioned above, the electro-optical properties of the PDLC film depend largely on the dispersibility and size of liquid crystals, the concentrations of liquid crystal and surfactant in the liquid crystal/aqueous polymer solution and the thickness of the final film.

The present invention also relates to a process for producing said highly functional PDLC films. PDLC films according to the present invention can be prepared in the following method. Firstly, a hydrophilic monomer is polymerized with one or more hydrophobic monomers to form a copolymer. The copolymer is washed and dried and then dissolved in water, together with a surfactant. To this solution, a liquid crystal is dispersed to form a liquid crystal/aqueous polymer solution, which is placed between glass substrates to remove any water, thereby obtaining a PDLC film. The PDLC films may be obtained by conventional methods for preparing PDLC films, except when raw materials are required.

The present invention is described in more detail through reference of the following examples without limiting the scope of the invention in any way.

EXAMPLE 1

An acrylamide-styrene copolymer was synthesized by reacting 58% by weight water soluble acrylamide non-water soluble styrene (both are manufactured by Junsei Chemical Co., in Japan) in a solution containing 20% by weight dioxane. The content of styrene was 20% by weight based on the total monomer weight. As an initiator for polymerization, 2% by weight of azo-bis-isobutyronitrile was used. The polymerization temperature was 60° C. The synthesized copolymer was washed with acetone several times and dried in a vacuum. The molecular structure of the copolymer is as shown above. To this copolymer, octaoxyethylene nonylphenol NP-8™ (manufactured by Merck Co.), a non-ionic surfactant, was added. A low molecular weight nematic liquid crystal mixture E-7™ (BL-001™, manufactured by Merck Co.) was also used.

As shown in FIG. 1, the NCAP film was prepared as follows. Firstly, the liquid crystal was added to the aqueous polymer to the desired concentration and then the liquid crystal was evenly dispersed therein. After removing foam as necessary, the resultant solution was applied onto an indium-tin-oxide glass plate (step 2) by using a spacer to form a liquid film about 10 $\mu$m thick. The film was completely dried in a drier at 60° C. to obtain a NCAP film. Another indium-tin-oxide glass plate was placed over the NCAP film (step 3) to give a NCAP cell. The electro-optical properties of the prepared polymer/liquid crystal dispersion composite film were determined using the apparatus shown in FIG. 2.

The composition ratio and properties of the polymer/liquid crystal dispersion composite film of Example 1 are shown in Table 1. The electro-optical properties are shown in Table 2.

EXAMPLE 2

3-(trifluoromethyl)styrene and acrylamide were polymerized in a solution containing 20% by weight dioxane to form an acrylamide-styrene copolymer. The content of styrene was 20% by weight based on the total monomer weight. The acrylamide and styrene used were manufactured by Junsei Chemical Co., in Japan. Using a method similar to that described in Example 1, a NCAP cell was produced. The electro-optical properties of the resulting polymer/liquid crystal dispersion composite film were determined using the apparatus shown in FIG. 2.

The composition ratio and properties of the polymer/liquid crystal dispersion composite film of Example 2 are shown in Table 1. The electro-optical properties are shown in Table 2.

EXAMPLE 3

In order to produce new non-water soluble functional groups for the copolymer, nonylphenol and methacryloylchloride were polymerized to yield nonylphenyl methacrylate. The nonylphenyl methacrylate was in turn polymerized with acrylamide in a solution containing 20% by weight dioxane. The content of nonylphenyl methacrylate was adjusted to 15% by weight based on the total weight of nonylphenyl methacrylate and acrylamide, to form an acrylamide-nonylphenyl methacrylate copolymer. A NCAP cell, 6 $\mu$m thick, was produced using a method similar to the described Example 1 by using a low molecular nematic liquid crystal mixture E-8 (BL-002, manufactured by Merck Co.). The electro-optical properties of the resulting polymer, liquid crystal dispersion composite film were determined using the apparatus shown in FIG. 2.

The composition ratio and properties of the polymer/liquid crystal dispersion composite film of Example 2 are shown in Table 1. The electro-optical properties are shown in Table 2.

EXAMPLE 4

Nonylphenyl methacrylate and acrylamide were polymerized in a solution containing 20% by weight dioxane in a manner similar to Example 3 except that the content of nonylphenyl methacrylate was adjusted from 20% by weight to 15% by weight to form an acrylamide-nonylphenyl methacrylate copolymer. A NCAP cell, 10 $\mu$m thick, was produced, also in a manner similar to Example 3. The electro-optical properties of the resulting polymer/liquid crystal dispersion composite film were determined using the apparatus shown in FIG. 2.

The composition ratio and properties of the polymer/liquid crystal dispersion composite film of Example 1 are shown in Table 1. The electro-optical properties are shown in Table 2.

EXAMPLE 5

Nonylphenyl methacrylate and acrylamide were polymerized in a solution containing 20% by weight dioxane in a manner similar to Example 3 except that the content of nonylphenyl methacrylate was adjusted from 20% by weight to 15% by weight to form an acrylamide-nonylphenyl methacrylate copolymer. A NCAP cell, 20 μm thick, was produced, also in a manner similar to Example 3. The electro-optical properties of the resulting polymer/liquid crystal dispersion composite film were determined using the apparatus shown in FIG. 2.

The composition ratio and properties of the polymer/liquid crystal dispersion composite film of Example 1 are shown in Table 1. The electro-optical properties are shown in Table 2.

EXAMPLE 6

Nonylphenyl methacrylate and acrylamide were polymerized in a solution containing 20% by weight dioxane in a manner similar to Example 3 except that the content of nonylphenyl methacrylate was adjusted from 20% by weight to 15% by weight to form an acrylamide-nonylphenyl methacrylate copolymer. A NCAP cell, 25 μm thick, was produced, also in a manner similar to Example 3. The electro-optical properties of the resulting polymer/liquid crystal dispersion composite film were determined using the apparatus shown in FIG. 2.

The composition ratio and properties of the polymer/liquid crystal dispersion composite film of Example 1 are shown in Table 1. The electro-optical properties are shown in Table 2.

TABLE 1

| Weight ratio | | In a liquid crystal/aqueous polymer solution (% by weight) | | | |
|---|---|---|---|---|---|
| of hydrophobic monomer in copolymer (% by weight) | Inherent viscosity (dl/g) | Concentration of polymer | Concentration of a liquid crystal to polymer | Concentration of surfactant to polymer | Thickness (μm) |
| Ex. 1 20 (St) | 0.68 | 15 | 60 | 4.5 | 10 |
| Ex. 2 20 (3TFMSt) | 0.6 | 15 | 60 | 1 | 10 |
| Ex. 3 15 (NPMA) | 0.4 | 15 | 60 | 5.5 | 6 |
| Ex. 4 15 (NPMA) | 0.4 | 15 | 50 | 5.5 | 10 |
| Ex. 5 12 (NPMA) | 0.82 | 10 | 60 | 4 | 20 |
| Ex. 6 12 (NPMA) | 0.82 | 10 | 70 | 4 | 25 |

(Note)
Ex.=Example, St=styrene, 3TFMSt=3-(trifluoromethyl) styrene, NPMA=nonylphenyl methacrylate
* Each value was determined by averaging the results obtained for the respective example.

The electro-optical properties of NCAP films prepared in examples were measured by the following methods.

Transmittance

Figure 2:
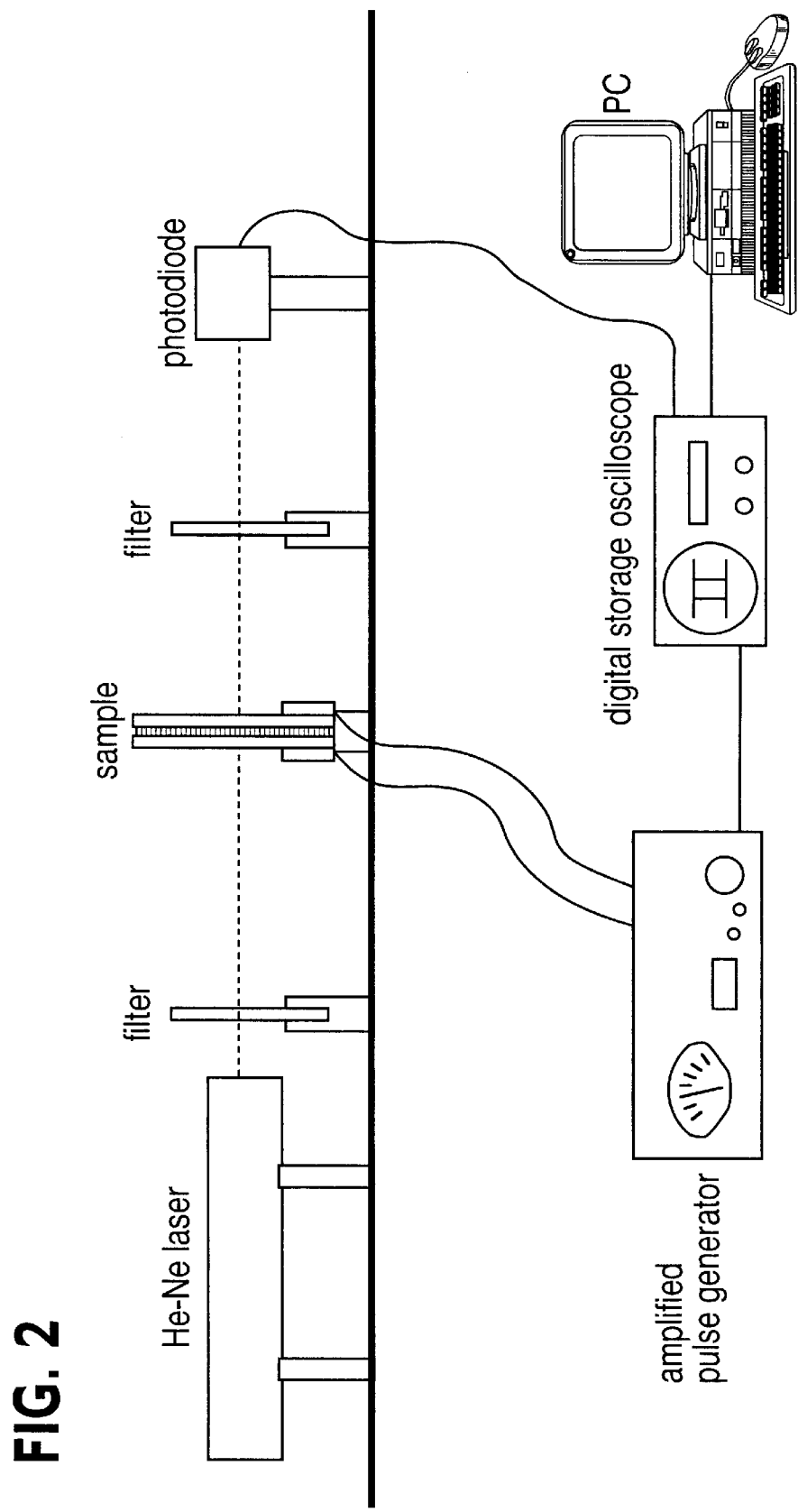
FIG. 2 shows a schematic view of an apparatus for measuring electro-optical properties of NCAP films.
Figure 3:
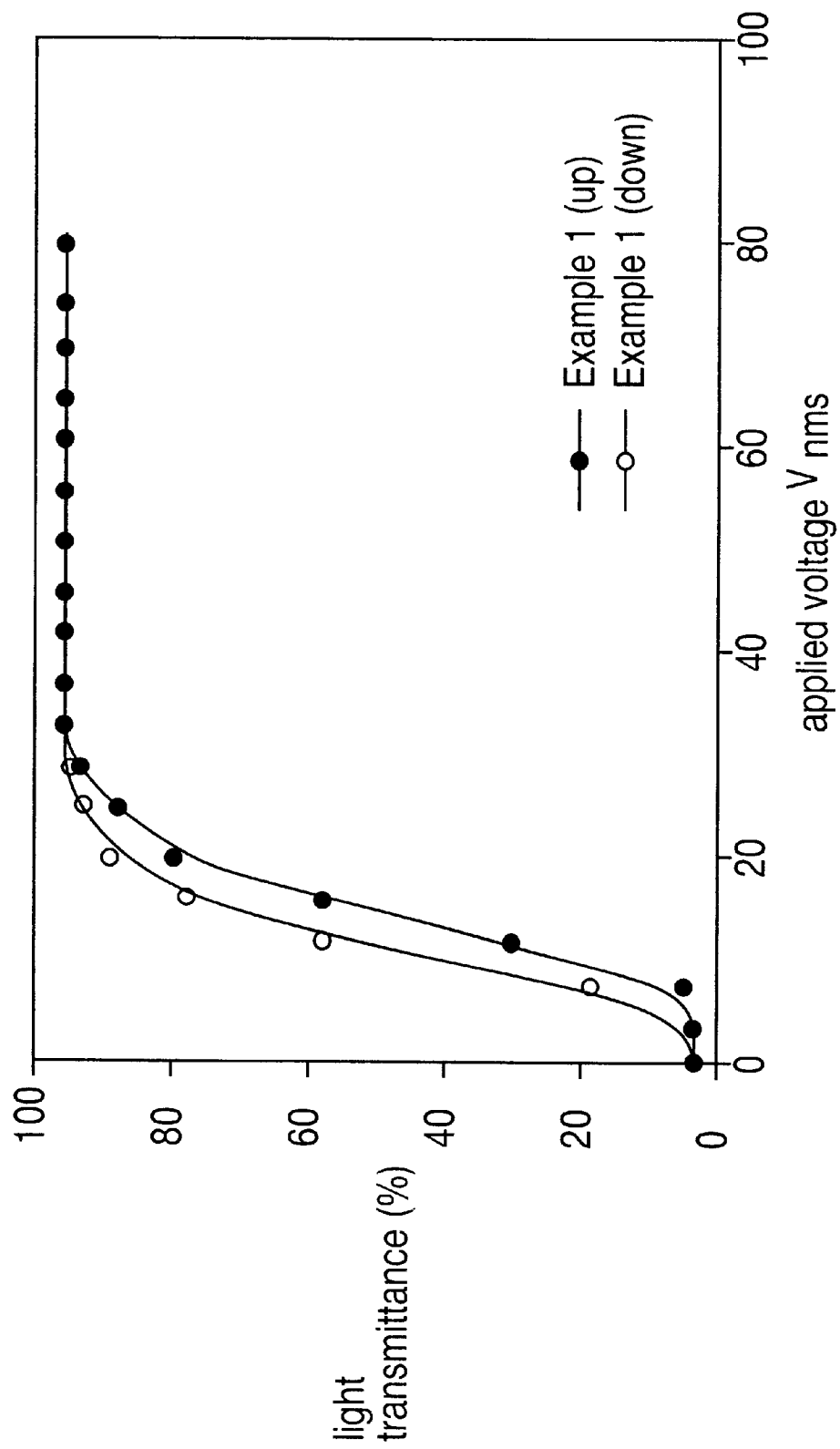
FIG. 3 shows a relationship between applied voltage and light transmittance for an NCAP film formed according to Example 1 of the present invention.
Figure 4:
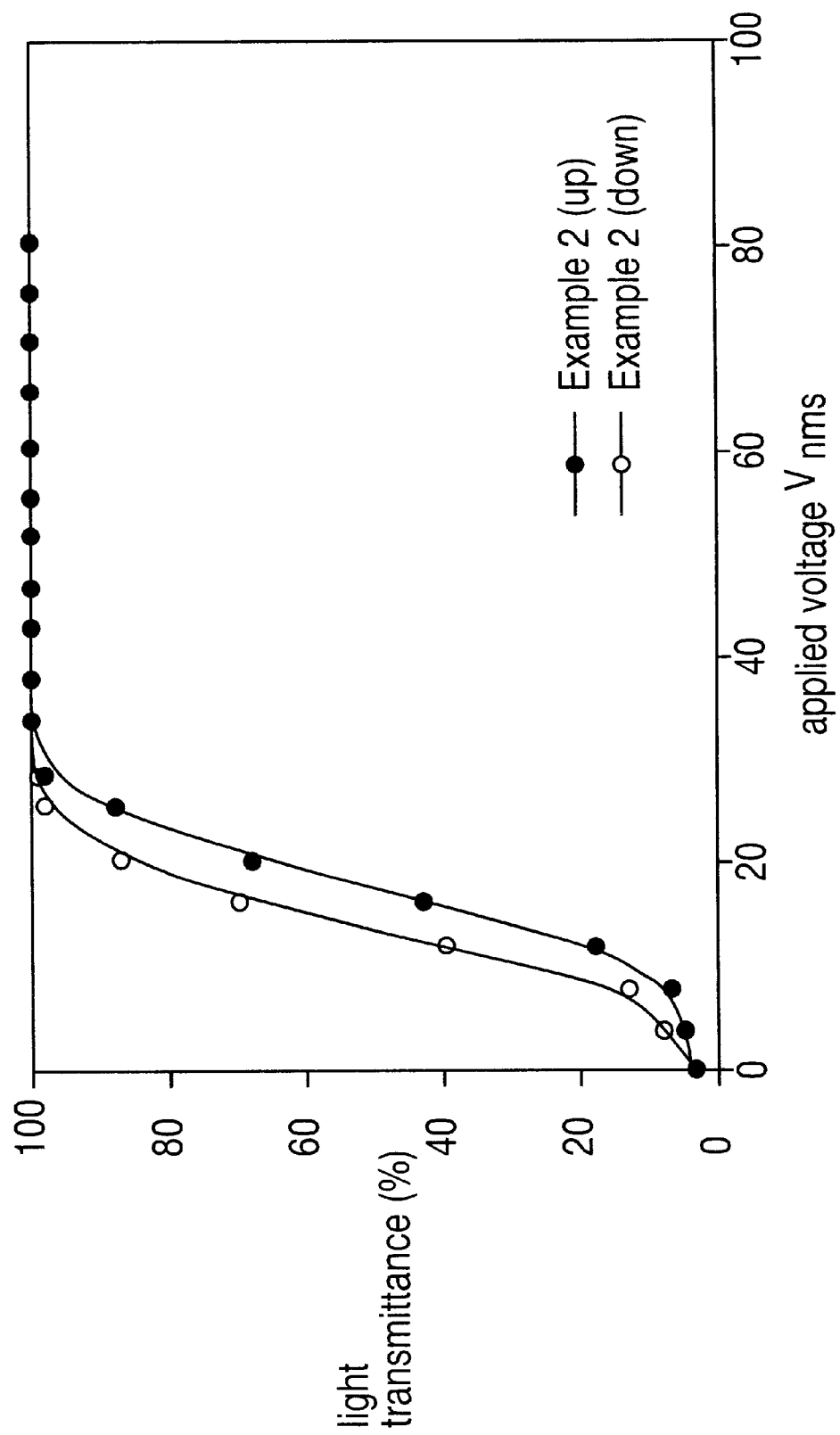
FIG. 4 shows a relationship between applied voltage and light transmittance for an NCAP film formed according to Example 2 of the present invention.
Figure 5:
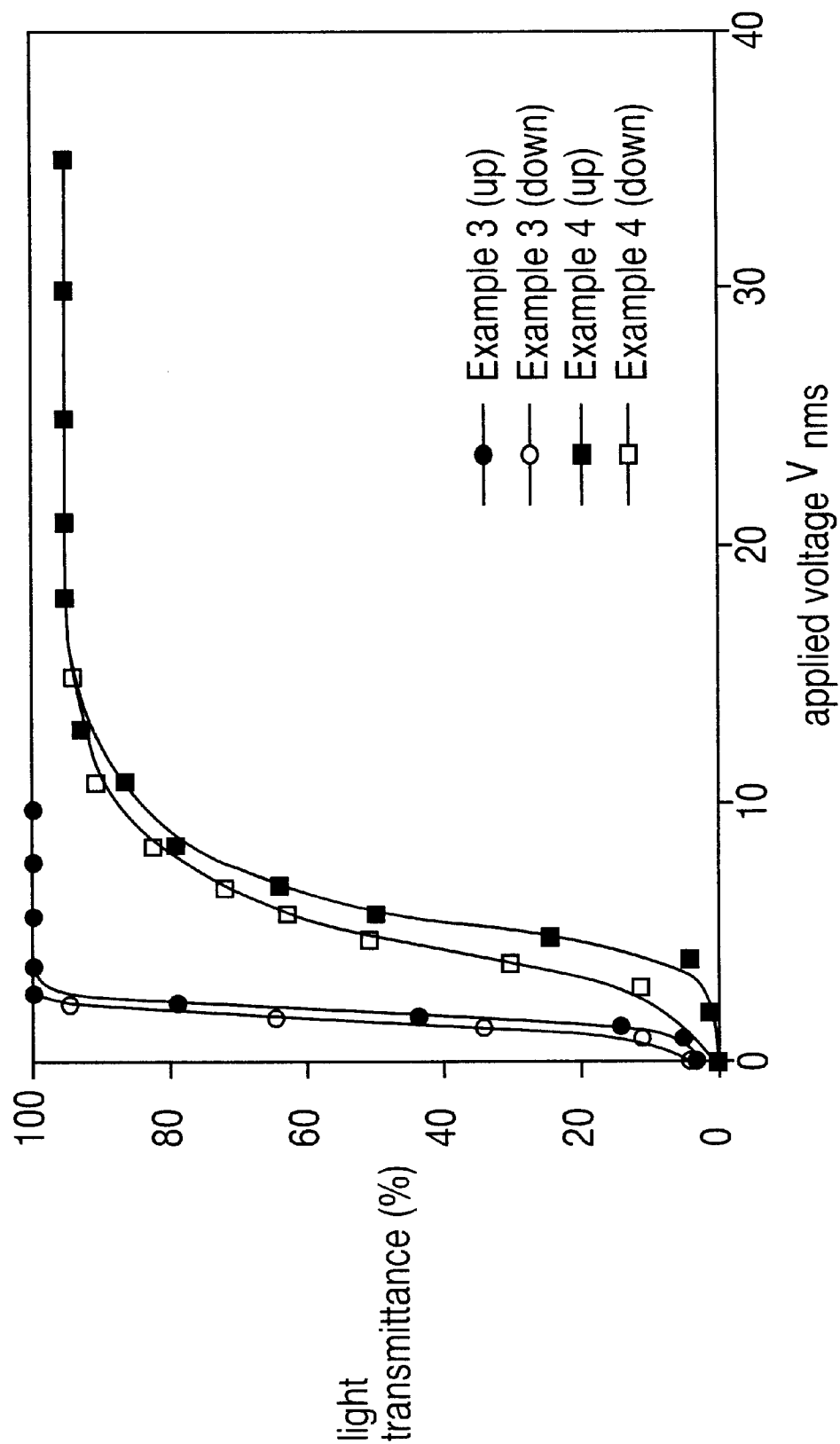
FIG. 5 shows a relationship between applied voltage and light transmittance for NCAP films formed according to Examples 3 and 4 of the present invention.
Figure 6:
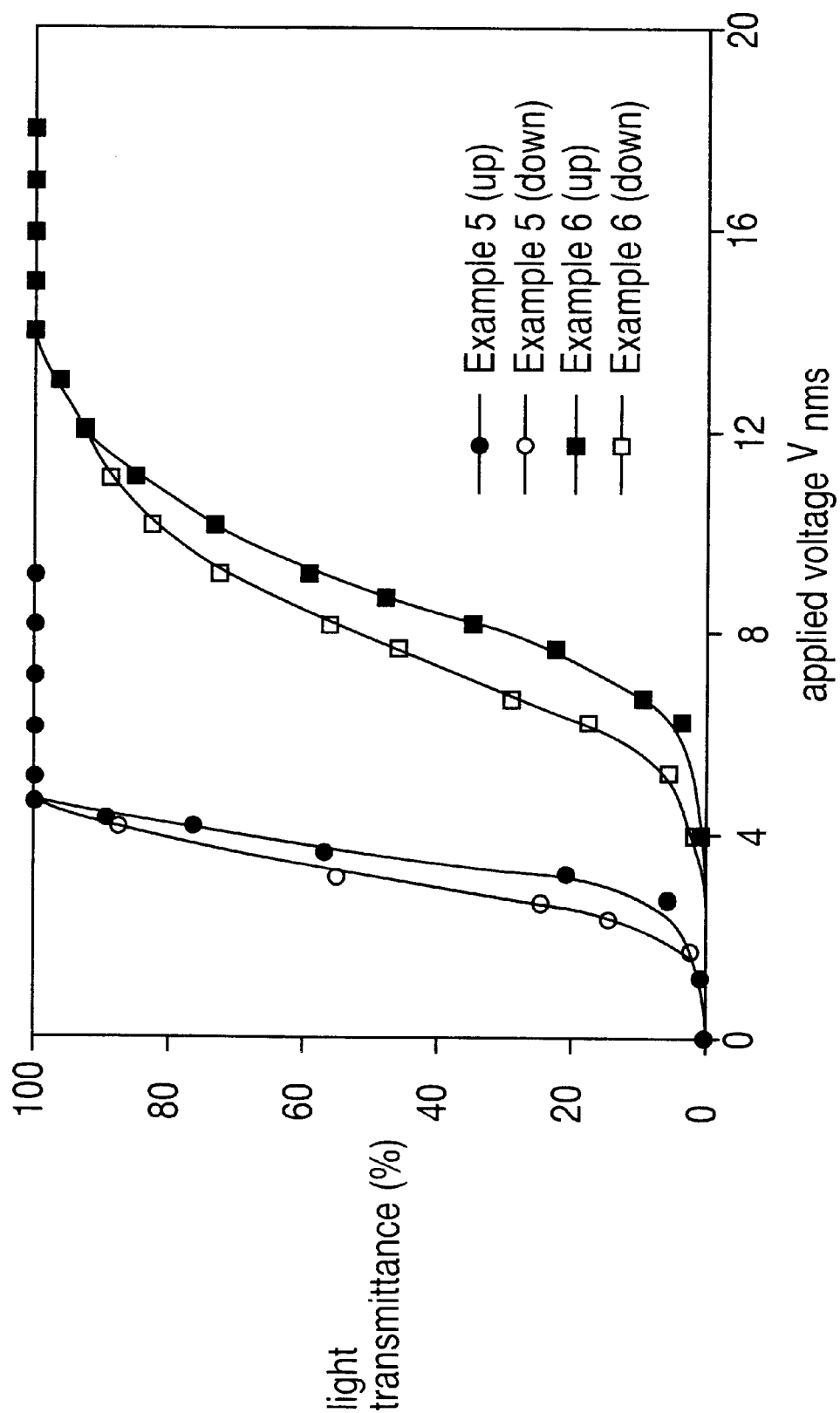
FIG. 6 shows a relationship between applied voltage and light transmittance for NCAP films formed according to Examples 5 and 6 of the present invention.

To determine how light transmittance changes with changing voltage, an apparatus shown in FIG. 2 was used. The light used in the experiment was produced by a He—Ne laser. The light had a wavelength of 632.8 nm, and was sent through a primary filter prior to irradiation onto the PDLC cell ("sample"). An amplified pulse generator was connected to the PDLC sample and a digital oscilloscope. The primary filter controlled the intensity of the light. After passing through the PDLC sample, the light passed through a secondary filter in order to remove non-linear elastic light produced by light scattering. Finally, the light was detected using a silicon photo-diode. Through the photodiode and the digital storage oscilloscope, changes in the intensity of the light received at the photodiode were converted into changes in current, which were input to a personal computer ("PC") by means of an A/D converter. When no light reached the photodiode, the transmittance of the PDLC sample was presumed to be zero. The intensity for 100% transmittance was determined by passing the light through the filters and two ITO glasses not having a PDLC film therebetween.

Response Time

The response time includes rising time and decay time. The rising time is the time required for the nematic liquid crystals to change direction and align with the direction of an applied electric field. This alignment process changes the light transmission characteristics of the PDLC film. The decay time is the time required to restore the film to the original light transmission condition. That is, the decay time is the time it takes for the liquid crystals to become unaligned and returned to their original disordered orientation. The response time is defined as the sum of the rising time and the decay time.

Threshold Voltage and Driving Voltage

The threshold voltage represents the voltage ($V_{10}$) that achieves a transmittance corresponding to 10% of the maximum transmittance ($T_{max}$). The driving voltage is defined as the voltage ($V_{90}$) that achieves a transmittance corresponding to 90% of the maximum transmittance ($T_{max}$).

Hysteresis

Hysteresis is a phenomenon related to a system's resistance in changing from one condition to an opposite condition. Here hysteresis represents a difference in the applied voltages required to achieve a single transmittance when increasing the applied voltage and when decreasing the applied voltage. To evaluate the above described examples, the difference in $\Delta V_{50}$, i.e., the applied voltages required to achieve 50% transmittance, were compared. FIGS. 3 through 6 are useful in illustrating hysteresis. The shaded circle lines show the transmittance achieved when increasing voltage and the outline circle lines show the transmittance achieved when decreasing voltage.

TABLE 2

| | Driving voltage ($V_{ms}$) | Threshold voltage ($V_{ms}$) | Response Time (ms) | Hysteresis ($V_{ms}$) | Contrast ratio |
|---|---|---|---|---|---|
| Ex. 1 | 13 | 9 | 17 | 3 | 48 |
| Ex. 2 | 26 | 10 | 24 | 4 | 33 |
| Ex. 3 | 3 | 1 | 13 | 0.3 | 25 |
| Ex. 4 | 12 | 3 | 18 | 1 | 95 |
| Ex. 5 | 4.2 | 1.8 | 16 | 0.5 | 100 |
| Ex. 6 | 11 | 6 | 24 | 1 | >100 |

*Each value was determined by averaging the results obtained for the respective example.
*The contrast ratio is expressed by the following formula:
Contrast ratio = $T_{max}/T_{min}$ According to the present invention, it is possible to prepare highly functional polymer/liquid crystal dispersion composite films having good optical properties. For example, the films exhibits a high contrast ratio, a low driving voltage and low hysteresis. The films may also require less liquid crystal than conventional films.

The PDLC films according to the present invention can be used in windows, large liquid crystal displays and light blocking devices. Further, the PDLC films can be used in color projectors, light bulbs for controlling the intensity of interior light and solar heat gains.

What is claimed is:

1. A polymer/liquid crystal dispersion comprising:

a water soluble copolymer obtained by polymerizing a hydrophilic monomer selected from the group consisting of acrylamide, acrylonitrile and acryloyl chloride with one or more hydrophobic monomers selected from the group consisting of styrene, 3-(trifluoromethyl) styrene and nonylphenyl methacrylate, the content of the one or more hydrophobic monomers being 14 to 25% by weight based on the combined weight of the one or more hydrophobic monomers and the hydrophilic monomer;

a surfactant;

a liquid crystal; and water, the water soluble copolymer, the surfactant, the liquid crystal and the water forming a liquid crystal/aqueous polymer solution, the concentration of the surfactant in the liquid crystal/aqueous polymer solution being in the range of 1 to 5.5% by weight.

2. A polymer/liquid crystal dispersion according to claim 1, wherein said liquid crystal is a nematic liquid crystal formed of an azomethine compound or an azo compound.

3. A polymer/liquid crystal dispersion according to claim 1, wherein the concentration of the liquid crystal in the liquid crystal/aqueous polymer solution is in the range of 50 to 70% by weight.

4. A polymer/liquid crystal dispersion according to claim 1, wherein the surfactant is a non-ionic surfactant.

5. A sandwiched composite film, comprising:

a polymer/liquid crystal dispersion having:

a water soluble copolymer obtained by polymerizing a hydrophilic monomer selected from the group consisting of acrylamide, acrylonitrile and acryloyl chloride with one or more hydrophobic monomers selected from the group consisting of styrene, 3-(trifluoromethyl)styrene and nonylphenyl methacrylate, the content of the one or more hydrophobic monomers being 14 to 25% by weight based on the combined weight of the one or more hydrophobic monomers and the hydrophilic monomer;

a surfactant;

a liquid crystal; and water, the water soluble copolymer, the surfactant, the liquid crystal and the water forming a liquid crystal/ aqueous polymer solution, the concentration of the surfactant in the liquid crystal/aqueous polymer solution being in the range of 1 to 5.5% by weight, a pair of plates sandwiching the polymer/liquid crystal dispersion.

6. A sandwiched composite film according to claim 5, wherein the thickness of the composite film is 6 to 25 $\mu$m.

7. A sandwiched composite film according to claim 5, wherein said liquid crystal is a nematic liquid crystal formed of an azomethine compound or an azo compound.

8. A sandwiched composite film according to claim 5, wherein the concentration of the liquid crystal in the liquid crystal/aqueous polymer solution is in the range of 50 to 70% by weight.

9. A sandwiched composite film according to claim 5, wherein the surfactant is a non-ionic surfactant.

10. A method for producing a polymer/liquid crystal dispersion composite film, comprising the following steps:

a) polymerizing a hydrophilic monomer selected from the group consisting of acrylamide, acrylonitrile and acryloyl chloride with one or more hydrophobic monomers selected from the group consisting of styrene, 3-(trifluoromethyl)styrene and nonylphenyl methacrylate to form a water soluble copolymer, the content of the one or more hydrophobic monomers being 14 to 25% by weight based on the combined weight of the one or more hydrophobic monomers and the hydrophilic monomer;

b) washing and drying the water soluble copolymer and then dissolving the water soluble copolymer in water and a surfactant to form a solution;

c) after steps (a) and (b), dispersing a liquid crystal into the solution to produce a liquid crystal/polymer aqueous solution, the concentration of the surfactant in the liquid crystal/aqueous polymer solution being in the range of 1 to 5.5% by weight; and d) placing the liquid crystal/polymer aqueous solution between glass substrates in order to remove water therefrom.

11. A method for producing a polymer/liquid crystal dispersion composite film according to claim 10, wherein said liquid crystal is a nematic liquid crystal formed of an azomethine compound or an azo compound.

12. A method for producing a polymer/liquid crystal dispersion composite film according to claim 10, wherein the concentration of the liquid crystal in the liquid crystal/ aqueous polymer solution is in the range of 50 to 70% by weight.

13. A method for producing a polymer/liquid crystal dispersion composite film according to claim 10, wherein the surfactant is a non-ionic surfactant.

* * * * *